UNITED STATES PATENT OFFICE.

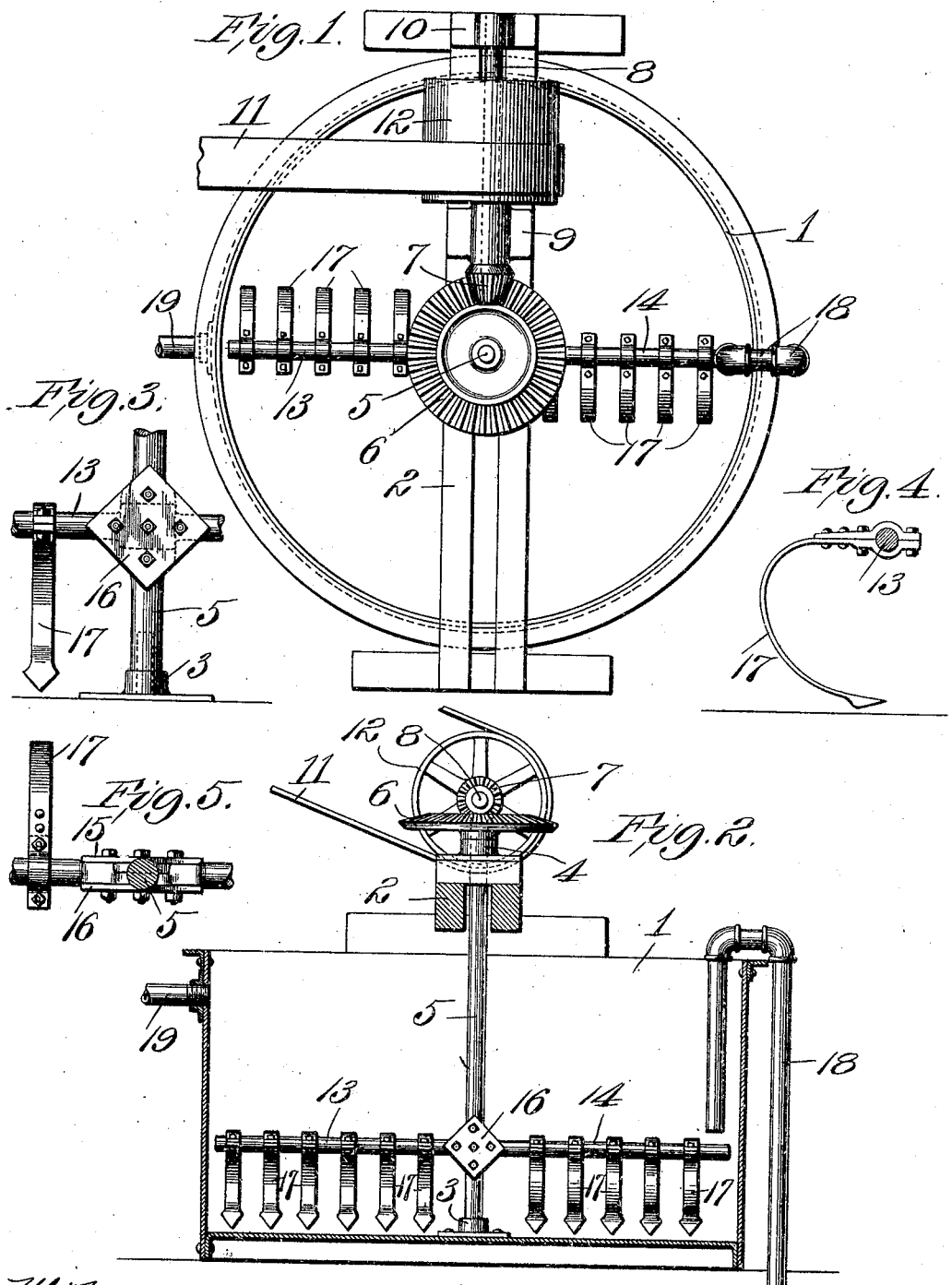

JOHN F. WIXFORD, OF ST. LOUIS, MISSOURI.

PROCESS OF PREPARING AND FEEDING MILK OF LIME.

No. 806,946.        Specification of Letters Patent.        Patented Dec. 12, 1905.

Application filed July 17, 1905. Serial No. 269,939.

*To all whom it may concern:*

Be it known that I, JOHN F. WIXFORD, a citizen of the United States, and a resident of the city of St. Louis, State of Missouri, have invented a new and useful Process of Preparing and Feeding Milk of Lime, of which the following is a specification.

My invention relates to a process of preparing and feeding calcium hydrate in the form commonly known as "milk of lime." In industrial processes in which lime is used in large quantities as a reagent—such as in water purification, for example—the proper distribution of the lime or calcium hydrate throughout the matter to be treated has been a matter of much difficulty. It is not feasible in many cases to introduce either lime or the hydrate of lime in solid form. Lime is so slightly soluble in water that the use of aqueous solutions is usually prohibited by their necessarily large volume. The use of the aqueous mixture known commonly as "milk of lime" is free from the objections to which the use of either lime or calcium hydrate in solid form or in solution is subject.

It is the principal object of the present invention to prepare and feed milk of lime in a continuous stream of any desired volume carrying any desired amount of calcium hydrate per unit of volume.

My invention consists in the process hereinafter described and claimed.

In the accompanying drawings, forming a part of this specification, and wherein like symbols refer to like parts wherever they occur, Figure 1 is a plan view of apparatus used in carrying out the process. Fig. 2 is a vertical central sectional view of the apparatus shown in Fig. 1, and Figs. 3, 4, and 5 show details of construction.

One form of apparatus by means of which the process may be carried out is shown in the accompanying drawings.

A tank or vat 1, preferably of iron, is provided, in which lime and water are mixed and the milk of lime is formed. A frame 2 extends over said tank or vat. A step-bearing 3 is arranged in the bottom of the tank, and in vertical alinement therewith is a vertical bearing 4 on the frame 2. A vertical shaft 5 is journaled in said bearings. At its upper end it carries a bevel-gear 6, which meshes with a bevel-gear 7 on a horizontal shaft 8, journaled in bearings 9 10 on the frame 2. The horizontal shaft may be driven by any means—as, for example, a belt 11, running over a pulley 12, mounted on the shaft. Near the lower end the vertical shaft 5 is flattened. Against said flattened portion a flattened portion of a horizontal bar 13 is secured by plates 15 16, bolted to the shaft and the bar. Upon the horizontal bar a plurality of flexible arms 17 are mounted. The arms upon one end are staggered with respect to the arms upon the other end, and thus the entire mass of lime is stirred. A pipe 18 leads from a source of supply of hot water and opens into the tank just above the plane of movement of the bars of the stirring mechanism. A pipe 19 leads from near the top of the tank to the conduit, pipe, or receptacle containing the matter to be treated.

In practicing the process equal measured quantities of commercial lime are dumped into the tank 1 at equal intervals of time. A stream of hot water of predetermined volume flows into the tank through the pipe 18. The temperature of the water is preferably above 125° Fahrenheit, though considerable variation is permissible. The reason for using hot water is that it is impracticable to slake lime in a running stream of cold water. The stirrer is actuated and stirs up the lime and prevents the collection of the lime or hydrate of lime at the bottom of the tank in a compact mass, the upper surface of which alone would be in immediate contact with the water. All the lime is converted into hydrate of lime. A small portion of the hydrate passes into solution, converting the water into lime-water, and the remainder is suspended in the lime-water. Milk of lime is thus formed, which overflows into the pipe 19, whereby it is conducted to the point at which it is to be used—as, for example, a conduit carrying water to be purified by the process of water purification described and claimed in my application, Serial No. 226,948, filed June 26, 1905.

During the first interval after the first charge has been introduced into the tank only a portion of the charge will be taken up by the water, and at the end of the interval of time a residuum will remain. A second charge equal to the first being now introduced, there will be a larger mass of lime and hydrate of lime in contact with the water, and a larger amount of lime will be taken up during the second interval of time. At the end of the interval, however, a residuum larger than the first will remain. The addition of equal charges at equal intervals being continued, a mass of lime or hydrate of lime will finally accumulate of such proportions that the amount of calcium hydrate taken up during any interval will be equivalent to the amount of the charge added for that interval. From this time on, so long as the addition of equal charges at equal intervals is continued, the milk of lime will flow from the tank in a continuous stream of substantially constant strength. The amount of each charge and the interval between charges may be varied considerably, but should be so chosen that the mass of the individual charge shall be small in comparison with the mass of lime accumulated in the tank. This being the case, a constant stream of milk of lime will be produced, and a constant amount of calcium hydrate per unit of time can be introduced into the matter to be treated.

The amount of calcium hydrate carried per unit of volume of the milk of lime flowing from the tank may be controlled as desired. To reduce the amount of lime in the mixture, the size of the charge may be reduced, the intervals between charges and the volume of the stream of hot water remaining the same; or the intervals between the charges may be lengthened, the size of the charges and the volume of the stream of hot water remaining the same; or the volume of the stream of hot water may be increased, the size of the charges and the intervals between charges remaining the same; or two or all of the elements may be simultaneously varied. To increase the amount of hydrate of lime per unit of volume of the milk of lime, the contrary changes would be made.

The process is capable of application not only in the preparation of a mixture in which lime or calcium hydrate is in suspension and water or lime-water is the menstrum, but is obviously capable of application in the preparation of other mixtures. While hot water is preferred for lime, the process may be carried on with cold water for other substances, such as hydrate of aluminium, hydrate of iron, and hydrate of lime.

What I claim as my invention, and desire to secure by Letters Patent, is—

1. The process of preparing a mixture of hydrate of lime which consists in passing a stream of hot water through a mass of lime or hydrate of lime and in adding measured charges of lime thereto at measured intervals of time.

2. The process of preparing a mixture of hydrate of lime which consists in passing a stream of hot water through a mass of lime or hydrate of lime and in adding measured charges of lime thereto at measured intervals of time and in agitating said mass and thoroughly mixing the same with the water.

3. The process of preparing milk of lime which consists in passing a continuous stream of hot water through a mass of lime or hydrate of lime and in adding thereto at measured intervals measured charges of lime or hydrate of lime.

4. The process of preparing milk of lime which consists in passing a continuous stream of water through a mass of lime or hydrate of lime, in adding thereto measured charges of lime or hydrate of lime at measured intervals of time, and in agitating said mass and thoroughly mixing the same with the water.

5. The process of preparing milk of lime which consists in passing a continuous stream of hot water through a mass of lime or hydrate of lime, in adding thereto measured charges of lime or hydrate of lime at measured intervals of time, and in agitating said mass and thoroughly mixing the same with the water.

6. The process of continuously preparing milk of lime of a constant strength which consists in passing a continuous stream of hot water through a mass of lime or hydrate of lime and in adding at equal intervals of time charges of lime each equivalent to the amount of the hydrate of lime carried away during each interval.

7. The process of continuously preparing milk of lime which consists in passing a continuous stream of hot water through a mass of lime or hydrate of lime, in adding thereto at equal intervals of time charges of lime each equivalent to the amount of the hydrate of lime carried away during each interval and in agitating said mass and thoroughly mixing the same with the water.

In testimony whereof I have signed my name to this specification, in the presence of two subscribing witnesses, this 14th day of July, 1905, at St. Louis, Missouri.

JOHN F. WIXFORD.

Witnesses:
FRED F. REISNER,
JAMES A. CARR.